United States Patent [19]
Krueger

[11] Patent Number: 6,066,376
[45] Date of Patent: May 23, 2000

[54] HIGH BARRIER NON-FOIL LAMINATE COMPOSITION

[75] Inventor: Duane A. Krueger, Winneconne, Wis.

[73] Assignee: Pechiney Plastic Packaging, Inc., Chicago, Ill.

[21] Appl. No.: 08/877,225

[22] Filed: Jun. 17, 1997

[51] Int. Cl.[7] .................................................. B29D 22/00
[52] U.S. Cl. .................... 428/35.7; 428/35.8; 428/35.9; 428/36.6; 428/36.7; 428/458
[58] Field of Search ................... 428/35.7, 35.8, 428/35.9, 36.6, 36.7, 458

[56] References Cited

U.S. PATENT DOCUMENTS

| | | | |
|---|---|---|---|
| 3,347,419 | 10/1967 | Brandt et al. | 222/107 |
| 4,421,823 | 12/1983 | Theisen | 428/349 |
| 4,656,068 | 4/1987 | Raines | 229/123.1 |
| 4,735,835 | 4/1988 | Taira | 428/35 |
| 4,828,915 | 5/1989 | Schroeder et al. | 428/332 |
| 4,927,689 | 5/1990 | Markiewicz | 428/34.8 |
| 5,427,235 | 6/1995 | Powell et al. | 206/245 |
| 5,542,529 | 8/1996 | Hein, III et al. | 206/245 |
| 5,766,751 | 6/1998 | Kotani et al. | 428/323 |

*Primary Examiner*—Leszek Kiliman
*Attorney, Agent, or Firm*—McDermott, Will & Emery

[57] ABSTRACT

A high-barrier non-foil laminate composition is disclosed. The laminate composition comprises an outer heat stable layer, a barrier layer, and an inner layer that readily adheres to metal with the application of heat. The outer and inner layers may be bonded to the barrier layer by means of adhesive layers. Preferably, the outer layer comprises a material with a higher melting temperature than the inner layer such as polyethylene terephthalate. The barrier layer may be a high-barrier saran and the sealant layer may be a copolymer of ethylene and acrylic acid.

9 Claims, 1 Drawing Sheet

HIGH BARRIER NON-FOIL LAMINATE COMPOSITION

BACKGROUND OF THE INVENTION

The present invention relates to a high barrier non-foil material that can be easily sealed to metal and more particularly to a high barrier lamination using high barrier saran film and incorporating an outer heat stable layer and an inner layer that readily adheres to metal with the application of heat.

DESCRIPTION OF THE RELATED ART

A high barrier non-foil material that seals strongly to metal and is resistant to attack by chemicals would be a useful composition for a wide variety of applications. A coextruded barrier film coated with an acid sealant material, however, has been found to provide insufficient heat stability.

U.S. Pat. No. 3,347,419 to Brandt et al. shows a laminated collapsible dispensing tube having an intermediate layer of metal foil which provides barrier protection, an inner layer of a copolymer of ethylene and acrylic acid or acrylic acid ester to the foil layer, and a second layer of a polyolefin bonded to the inner copolymer layer. However, there is still a need for a high barrier non-foil material that would seal strongly to metal and be resistant to attack by chemicals.

OBJECTIVES AND FEATURES OF THE INVENTION

It is an object of the present invention to provide a high barrier non-foil laminate composition that will seal strongly to metal and be resistant to attack by chemicals, so that it may be used in a wide variety of applications.

It is further objective of the present invention to provide such a laminate composition that allows for the use of a wide variety of outer heat stability materials and a wide variety of inner layer materials that bond to metal.

It is a further feature of the present invention to provide such a laminate composition which may be used as a component for chemical containment for batteries.

It is a further objective of the present invention to provide such a laminate composition whose outer layer can be any thickness of oriented polyester, oriented nylon or other material with a higher melting temperature than the sealant.

It is a further objective of the present invention to provide such a laminate composition whose barrier layer may be a film of a copolymer of vinylidene chloride and a vinyl comonomer such as vinyl chloride, acrylonitrile or methyl acrylate (saran).

It is a further objective of the present invention to provide such a laminate composition whose inner layer can be any material that readily adheres to metal such as ethylene acrylic acid, ethylene acrylic acid ester, ethylene methacrylic acid, ionomer, or anhydride modified polyolefin.

It is a feature of the present invention to provide a high-barrier non-foil laminate composition. The laminate composition comprises an outer heat-stable layer, a barrier layer, and an inner layer that readily adheres to metal with the application of heat. For example, the outer layer may be any thickness of oriented polyester, oriented nylon or other material with a higher melting temperature than the sealant. The barrier layer may comprise a high barrier saran material such as is marketed under the trademark "Barrialon" (supplied by Asahi Kasei KK), a vinylidene chloride—methyl acrylate (MA-Saran) copolymer containing film, or a polyethylene/polyvinylidene chloride/polyethylene coextrusion supplied by American National Can which contains MA-Saran. For the inner layer, ethylene acrylic acid or ethylene acrylic acrid ester a copolymer may be used or any material that readily adheres to metal such as ethylene methacrylic acid copolymer, ionomer, or anhydride modified polyolefin.

It is a further feature of the present invention to provide a high-barrier non-foil laminate composition wherein the outer and inner layers are bonded to the barrier layer by means of adhesive layers. A first adhesive layer adjacent to the outer layer bonds the outer layer to one side of the barrier layer, and a second adhesive layer adjacent to the inner or sealant layer bonds the sealant layer to the other side of the barrier layer. Preferably the outer layer is an oriented film of polyethylene terephthalate, the barrier layer is a high barrier saran material and the sealant layer is an ethylene acrylic acid copolymer film of 1.5 mil thickness.

SUMMARY OF THE INVENTION

A high-barrier non-foil laminate composition is provided which can be easily and strongly sealed to metal and be resistant to attack by chemicals. The laminate has an outer heat stable layer, preferably comprising an oriented polyester such as polyethylene terephthalate, a barrier layer comprising a high barrier saran material, and an inner or sealant layer preferably comprising a film of ethylene acrylic acid copolymer that readily adheres to metal with the application of heat. Preferably the outer and inner layers are bonded to the barrier layer by layers of adhesives on each side of the barrier layer core which are chemically and heat resistant to degradation and loss of adhesion. The lamination allows for the use of a wide variety of outer heat stability materials and a wide variety of inner layer materials that bond to metal.

BRIEF DESCRIPTION OF THE DRAWING

Other objectives and features of the present invention will be apparent from the following description, taken in conjunction with the accompanying drawing. In the drawing.

DETAILED DESCRIPTION

Figure 1:
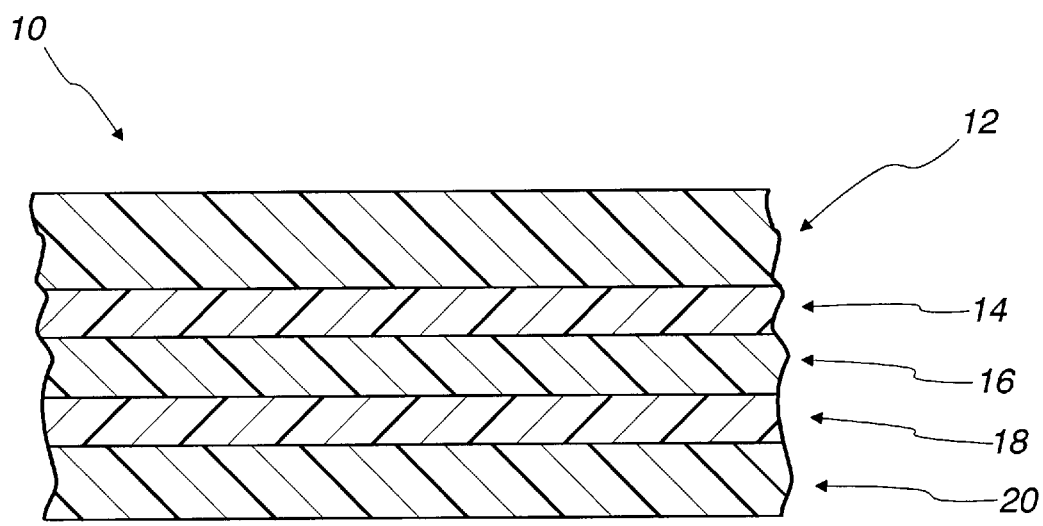
FIG. 1 is a fragmentary enlarged sectional view of the laminated structure of an embodiment of the present invention.

The laminated composition of the present invention is formed from an outer heat stable layer, a barrier layer, and an inner layer that readily adheres to metal with the application of heat. The outer and inner layers are preferably bonded to the barrier layer by means of adhesive layers.

The laminate 10 of an embodiment is shown in FIG. 1 and comprises an outer layer 12, a first adhesive layer 14 adjacent to outer layer 12, a barrier layer or core 16 bonded on one side to first adhesive layer 14, a second adhesive layer 18 bonded on the other side of barrier layer 16, and an inner layer or sealant 20 adjacent second adhesive layer 18. Adhesive layers 14, 18 bond outer and inner layers 12, 20, respectively to barrier layer 16 are made from adhesives which are chemically and heat resistant to degradation and loss of adhesion. Each layer depicted in FIG. 1 may itself comprise a multilayer film.

Outer layer 12 can be any thickness of oriented polyester, oriented nylon or other material with a higher melting temperature than sealant 20. Biaxially oriented materials are preferred; however, uniaxially oriented nylon may be used.

Preferably 32 gauge polyethylene terephthalate film, such as is available from Rhone Poulenc, is used. However, the thickness may range from 25 gauge and below to up to several feet, depending on the application and the capabilities of the sealing equipment or the converting equipment used.

Barrier layer 16 comprises a high barrier saran material comprising a copolymer of vinylidene chloride and a vinyl comonomer such as vinyl chloride, acrylonitrile or methyl acrylate (saran). A high barrier Saran material is one having oxygen permeability of less than 0.4 g or cc per 100 square inches (1 g or cc per $m^2$). Typically, the barrier layer is on the order of 0.5 mil. to 2 mil. in thickness, but may be as low as 0.1 mil. Preferably 60 gauge Barrialon film is used. Barrialon is the trade name of a Ma-Saran containing film supplied by Asahi Kasei K.K. Alternatively, a coextruded film comprising saran, preferably a copolymer of vinylidene chloride and methyl acrylate such as Dow MA-Saran may be used. For example, the barrier layer may comprise a polyethylene/polyvinylidene chloride/polyethylene coextruded laminate film supplied by American National Can Company.

Inner layer 20 preferably comprises a copolymer of ethylene and acrylic acid or acrylic acid ester, but any material that readily adheres to metal such as ethylene methacrylic acid, ionomer, or anhydride modified polyolefin may be used. Preferably, inner layer 20 comprises an ethylene acrylic acid film of 1.0 or 1.5 mil thickness, but those skilled in the art will recognize that other thicknesses may be used depending on the particular application. For example, thicknesses as low as 0.5 mil. may be used depending on the amount of seal strength which is needed.

The laminate composition may be made in a two-pass operation. In the first pass, an adhesive is applied to the side of a PET film which has been treated to improve its adherability, for example by chemical or corona discharge treatment, and then the material is laminated to the treated side of a saran barrier layer. The saran is re-treated by chemical- or corona-treatment in line with tensions kept at a minimum to reduce curl.

Following in line treatment of the saran side of the first pass material, adhesive is applied to the saran side and the material is laminated to a side of an ethylene acrylic acid film which has been chemically or corona treated. The ethylene acrylic acid film is re-treated in line with care taken to avoid backside treatment and tension controlled to reduce curl. A high-barrier non-foil laminate composition results.

The laminate composition may be used in a wide variety of applications. For example, a membrane for chemicals which could be used in batteries may be constructed from the laminate which is resistant to attack by the chemicals in the battery and suitable to be sealed to the electrodes. In general, the thickness of the laminate composition is usually kept to a minimum in order to provide a flexible, soft pliable material that does not take up a lot of room.

The properties of the laminate composition in accordance with the invention are illustrated by the following example.

EXAMPLE

Five duplicate samples of a 2.5 mil caliper laminate composition are prepared having the structure 32 gauge PET/60 gauge Saran/150 gauge ethylene acrylic acid. The composition was found to have the following properties (standard deviation in parenthesis):

| | |
|---|---|
| TENSILE MD LBS | 23.69 (1.77) |
| TENSILE TD LBS | 24.39 (1.19) |
| TENSILE MD PSI | 9107 (680) |
| TENSILE TD PSI | 9380 (458) |
| ELONG MD % | 53.68 (7.53) |
| ELONG TD % | 59.29 (6.59) |
| TENSILE ENERGY ABSORPTION (TEA) MD, LBS/IN | 9.1 (1.9) |
| TENSILE ENERGY ABSORPTION (TEA) TD, LBS/IN | 9.7 (1.6) |
| PUNCTURE, LBS/IN | 7.13 (.33) |
| ENERGY ABSORPTION IMPACT TEST (IMPACT-EAIT) LBS | 89.2 (5.1) |
| ENERGY ABSORPTION IMPACT TEST (IMPACT-EAIT) FT-LBS | 3.68 (.36) |
| STIFFNESS MD, GRAMS | 10.3 (.31) |
| STIFFNESS TD, GRAMS | 17.7 (2.4) |
| TEAR MD, GRAMS | 42 |
| TEAR TD, GRAMS | 48 |
| GRAVES TEAR MD, LBS | 1.34 (.099) |
| GRAVES TEAR TD, LBS | 1.726 (.044) |
| SEAL S1 MD, LBS/IN | 11.1 (.2) |
| SEAL S1 TD, LBS/IN | 11.6 (1.36) |
| OXYGEN TRANSMISSION (OXTR), cc/100 sq. in/day | 0.083 0.083 |
| WATER VAPOR TRANSMISSION (WVTR), g/100 sq. in/day | 0.059 0.067 |
| FLEX FAILURE | 9.4 (AVG 5) |

I claim:

1. A high-barrier non-foil laminate composition consisting of:
   (a) an outer heat stable layer;
   (b) a barrier layer wherein said layer has an oxygen permeability of less than 0.4 g per 100 inches; and
   (c) an inner layer that readily adheres to metal with the application of heat wherein said material is selected from the group consisting of copolymer of ethylene and acrylic and/or acrylic acid ester, ethylene methacrylic acid copolymer and ionomer, and anhydride modified polyolefin and wherein said composition may optionally contain one or two adhesive layers.

2. A laminate composition as in claim 1 wherein the outer and inner layers are bonded to the barrier layer by means of adhesive layers.

3. A laminate composition as in claim 1 wherein the outer layer comprises a material with a higher melting temperature than the inner layer.

4. A laminate composition as in claim 1 wherein the outer layer comprises a material selected from the group consisting of oriented polyester and oriented nylon.

5. A laminate composition as in claim 1 wherein the outer layer comprises polyethylene terephthalate.

6. A laminate composition as in claim 1 wherein the barrier layer comprises a copolymer of vinylidene chloride and a vinyl comonomer selected from the group consisting of vinyl chloride, acrylonitrile and methyl acrylate.

7. A laminate composition as in claim 1 wherein the barrier layer comprises a coextruded film comprising a vinylidene chloride-methyl acrylate copolymer.

8. A laminate composition as in claim 1 wherein the inner layer comprises an ethylene acrylic acid copolymer sealant of 1.5 mil thickness.

9. A high-barrier non-foil laminate composition comprising:
   (a) an outer layer of oriented polyethylene terephthalate;
   (b) a first adhesive layer adjacent to the outer layer;
   (c) a barrier layer comprising a high-barrier saran film bonded to one side to the first adhesive layer wherein said layer has an oxygen permeability of less than 0.4 g per 100 inches;

(d) a second adhesive layer bonded on the other side of the barrier layer; and (e) a sealant layer adjacent to the second adhesive layer comprising ethylene acrylic acid copolymer.

* * * * *